Nov. 14, 1933.　　　　J. M. LUERS　　　　1,935,511
TOOL GAUGE
Filed Sept. 25, 1931
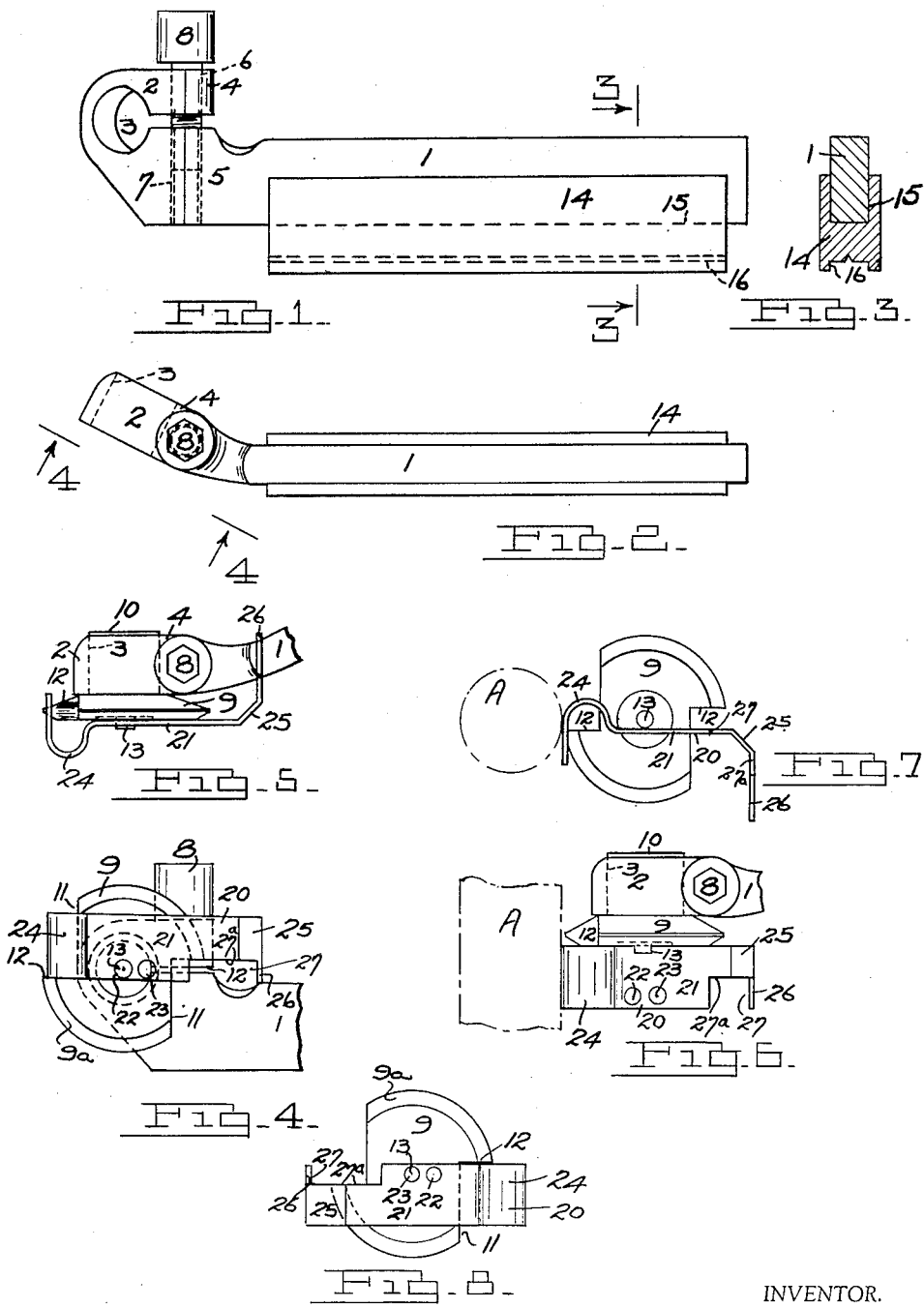
INVENTOR.
John M. Luers
BY
ATTORNEY.

Patented Nov. 14, 1933

1,935,511

UNITED STATES PATENT OFFICE 1,935,511

TOOL GAUGE

John M. Luers, Detroit, Mich.

Application September 25, 1931
Serial No. 565,121

3 Claims. (Cl. 33—185)

This invention relates to improvements in tool gauges.

It is an object of the invention to provide a simple form of combination gauge for use with circular cutting tools which may be employed for the following uses: As a grinding gauge for the tool blade; for setting the blade in the toolholder; and for setting the holder and blade at 90° to the work.

Another object of the invention is to provide such a gauge which is cheap and simple to manufacture and efficient in operation.

With these and other objects and advantages in view which will become apparent as the specification proceeds, the invention is hereinafter more fully described with the aid of the accompanying drawing in which a preferred embodiment of my gauge is shown.

In the drawing:

Figure 1 illustrates a side view of a toolholder and blade for use with which my gauge is intended.

Figure 2 is a plan view thereof.

Figure 3 is a section on the line 3—3 of Figure 1.

Figure 4 is a view on the line 4—4 of Figure 2, but with a blade in the holder, and the gauge in position for setting the blade.

Figure 5 is a plan view of Figure 4.

Figure 6 is a plan view of one extremity of the holder, showing the blade and the gauge in the position it is employed for setting both the holder and blade angularly relative to the work.

Figure 7 is a side view of Figure 6 but omitting the holder, and

Figure 8 is a side view of the blade showing how the gauge is employed when the cutting surfaces are being ground.

I will first describe the type of tool for use with which my gauge is primarily intended. Referring to the drawing, 1 designates a toolholder which is preferably rectangular in section for the greater portion of its length. At one extremity of the holder a head 2 is formed having a transverse opening 3 therethrough. The head 2 is preferably horizontally inclined relative to the remaining portion of the toolholder and is of such height that the centre of the opening 3 is preferably somewhat above the top of said remaining toolholder portion. Rearwardly from the opening 3 the head 2 is horizontally split thereby forming upper and lower head portions 4 and 5 normally spaced from one another, and through the said head portions 4 and 5 aligned apertures 6 and 7 respectively are formed. The aperture 7 is threaded to engage a screw 8 which extends downwardly through the aperture 6. Thus by tightening the screw 8 the size of the opening 3 may be diminished.

9 indicates a blade which is circular in form and has a concentric circular support 10 projecting from one side thereof, which, when the blade is in use, rests in the opening 3 where it is frictionally held by the screw 8. Peripheral recesses 11 are formed in the blade 9, one side 12 of each of which is substantially radial and constitutes a cutting surface. Projecting concentrically from the side of the blade remote from the circular support 10 is a circular projection 13 the purpose of which is hereinafter described.

By loosening the screw 8 the blade 9 may be rotated in the head 2 so that its second cutting surface may be brought into operative position, or again when the said screw has been loosened the blade may be entirely removed and replaced without requiring any fresh setting other than insuring that the cutting surface 12 to be used is correctly disposed relative to the holder, and this is quickly and simply accomplished with my gauge in a manner hereinafter described.

In practice thread cutting tools are, in the vast majority of cases, used in one of three different sizes of toolposts. In order that the tool may be held by a post of any one of the three sizes a detachable shank 14 is provided having opposed longitudinal grooves 15 and 16 formed therein. The section of the holder 1 is so proportioned as to fit the smallest sized toolpost. In order to fit either of the larger ones the shank 14 is arranged on the holder. The groove 15 is deeper than the groove 16 therefore when the holder rests in the groove 15 the distance from the top of the holder 1 to the underside of the shank 14 is less than when the toolholder rests in the groove 16. These two heights correspond to the heights required to suit the two larger toolposts, the width of the opening through which is the same in both cases and corresponds to the width of the shank 14.

20 denotes the gauge, the intermediate portion 21 of which is flat and has two openings 22 and 23 formed therethrough of such size that either fits over and is rotatable on the blade projection 13. One end of the gauge terminates in a hook-shaped portion 24 the outer extremity of which lies at substantially 90° to the intermediate portion 21. Towards its opposite end the gauge has a laterally inclined portion 25 which terminates in an extremity 26 also disposed at substantially 90° to the said intermediate portion 21. A longitudinal recess 27 is formed in one side of the gauge and extends throughout the length of the inclined portion 25 and through adjacent extremities of the intermediate portion 21 and of the gauge extremity 26.

When the blade 9 is supported in the head 2 and before the screw 8 is tightened the gauge is employed as shown in Figures 4 and 5. The projection 13 engages the opening 22, the gauge extremity 27 rests on the holder 1 and the blade 9 is turned until one cutting edge 12 comes into contact with the underside of the gauge extremity 24. The screw 8 is then tightened and the blade is correctly held relative to the holder 1. When setting the tool in the first instance relative to the work, indicated at A, the gauge is employed as shown in Figures 6 and 7. When the full width of the face of the hook-shaped portion 24 of the gauge bears longitudinally against the work A and one side of the gauge lies flat against one side of the blade 9 the correct angular position of the holder relative to the work has been obtained. When the gauge is used during blade grinding the projection 13 engages the gauge opening 23 and the cutting surfaces 12 are ground to lie parallel throughout their length with the base 27a of the recess 27. The inclined portion 25 of the gauge is so disposed as to lie adjacent the inclined marginal portion 9a of the blade.

While in the foregoing the preferred construction of the invention has been described and shown, it is understood that it is susceptible to such alterations and modifications as fall within the scope of the appended claims.

What I claim as my invention and desire to secure by Letters Patent is:

1. A gauge consisting of an elongated body portion having a flat apertured intermediate portion, each aperture being adapted to receive a projection on a blade so that the gauge may turn on said projection, both extremities of the gauge being laterally extended so that one extremity may rest on a cutting surface of the blade and the other extremity on a portion of a holder supporting said blade when the gauge is rotatably supported by said projection extending through one aperture, and said gauge having a marginal recess formed therein the base of which may be brought to lie parallel with either blade cutting surface when the blade projection extends through the second gauge aperture.

2. A gauge consisting of an apertured plate having both its extremities extended in the same direction and parallel with the axis of the plate aperture, the latter being adapted to receive a projection on a tool blade so that said gauge is rotatable on said tool blade, one laterally extended extremity of said plate being adapted to be moved so that it seats on a holder for said tool blade and the latter being adapted to be turned so that its cutting edge contacts the other extended extremity to set said blade in cutting position.

3. A gauge consisting of a plate having two apertures formed therethrough intermediately its ends and its extremities extended in substantially the same direction and parallel with the axis of said apertures, and said plate having a recess formed in one edge.

JOHN M. LUERS.